United States Patent [19]

Carsello

[11] Patent Number: 5,754,586
[45] Date of Patent: May 19, 1998

[54] DATA COMMUNICATION RECEIVER AND METHOD THEREIN FOR DETECTING POOR SIGNAL QUALITY

[75] Inventor: Stephen Carsello, Boynton Beach, Fla.

[73] Assignee: Motorola, Inc., Schaumburg, Ill.

[21] Appl. No.: 566,473

[22] Filed: Dec. 4, 1995

[51] Int. Cl.⁶ ................................................. H04B 17/02
[52] U.S. Cl. ........................... 375/213; 455/437; 371/5.1
[58] Field of Search .............................. 375/213, 227;
455/436, 443, 450, 452, 421, 434, 437;
371/3, 5.1

[56] References Cited

U.S. PATENT DOCUMENTS

| 4,829,519 | 5/1989 | Scotton et al. | 455/443 |
| 5,170,413 | 12/1992 | Hess et al. | 375/260 |

Primary Examiner—Stephen Chin
Assistant Examiner—Kevin Kim
Attorney, Agent, or Firm—R. Louis Breeden

[57] ABSTRACT

A data communication receiver (105) for detecting poor signal quality of received signals includes a receiver section (804) for receiving a first signal on a first frequency, the first signal having frames including a synchronization code that includes data symbols associated with expected signal levels. A crossing detector (250) processes absolute symbol errors for a number of data symbols included in the synchronization code of a first frame to generate an error sum value and averages the error sum value with other error sum values previously calculated for other frames to generate a quality value. When the quality value exceeds a threshold quality value, the crossing detector (250) determines that the first signal is of poor quality, and a controller (816) activates the receiver section (804) to scan other frequencies to locate a second frequency on which to receive a second signal.

16 Claims, 9 Drawing Sheets

DATA COMMUNICATION RECEIVER AND METHOD THEREIN FOR DETECTING POOR SIGNAL QUALITY

FIELD OF THE INVENTION

This invention relates in general to data communication receivers and more specifically to data communication receivers for detecting the quality of received signals.

BACKGROUND OF THE INVENTION

In some well known communication systems, such as systems using Motorola's REFLEX™ family of protocols, control channels are used to direct subscriber units, e.g., pagers, to other frequency channels and time intervals for message reception and transmission of message acknowledgments. For instance, control channels can be used to send high-speed address and vector data directing a recipient pager to single sideband AM (amplitude modulation) subchannels for analog voice reception.

In these prior art systems, a given control channel is associated with a frequency and, sometimes, a specific time interval. The frequency and time interval associated with control information are intended to service a particular geographical area referred to as a subzone. Other frequencies and time intervals are utilized in different subzones. Therefore, what is needed is a method and apparatus for detecting a subzone crossing so that a data communication receiver will receive control information at the correct frequency and time interval associated with a subzone into which the data communication receiver has relocated.

DESCRIPTION OF A PREFERRED EMBODIMENT

Figure 1:
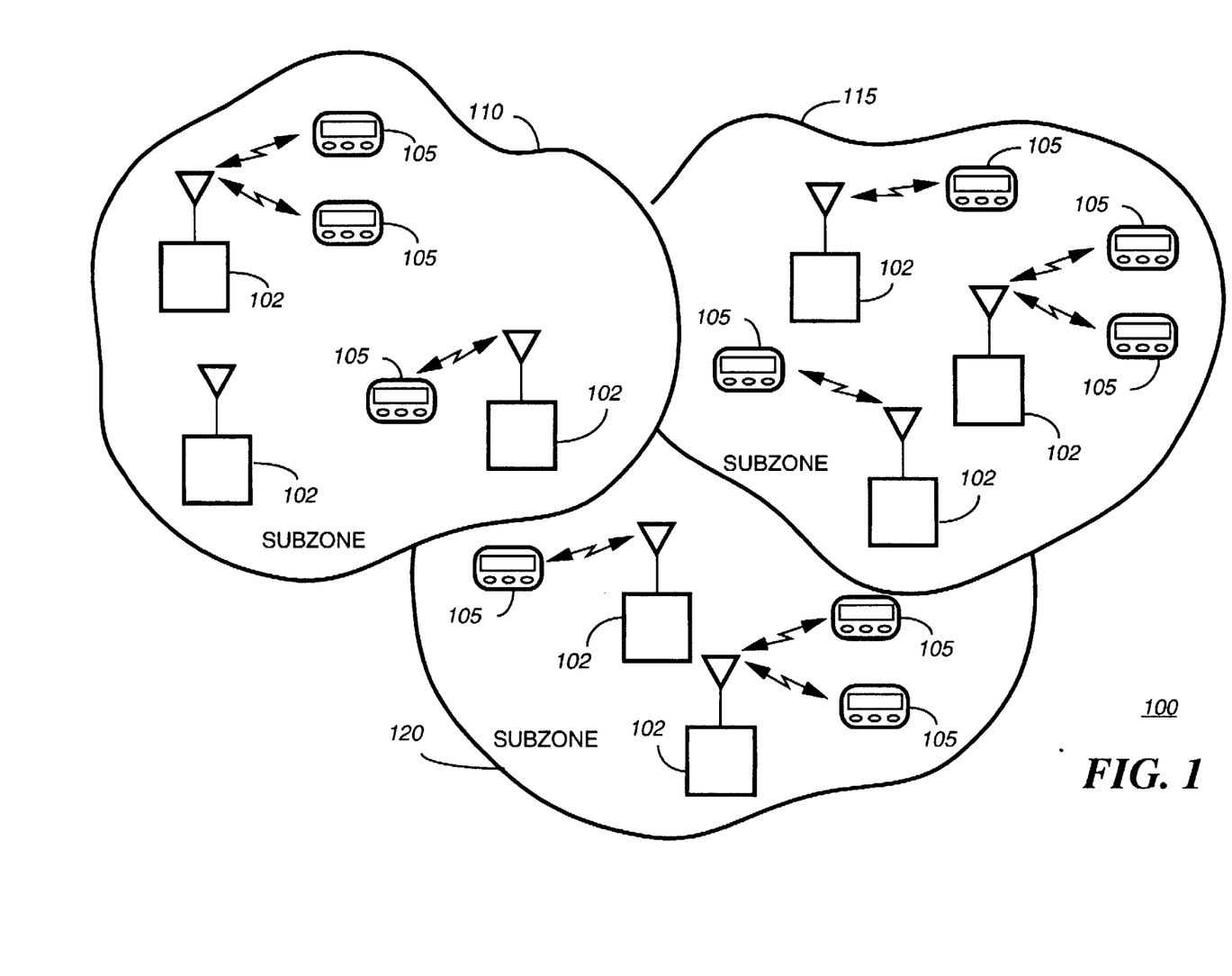
FIG. 1 is a diagram of a communication system in accordance with the present invention.

FIG. 1 is an electrical block diagram of a communication system 100, such as a paging system, in accordance with the preferred embodiment of the present invention. In such a communication system 100, messages originating either from a phone, as in a system providing numeric data transmission, or from a message entry device, such as an alphanumeric data terminal, are routed through the public switched telephone network (PSTN) to a paging terminal (not shown) which processes the numeric or alphanumeric message information into message streams for transmission by one or base stations 102 provided within the system 100.

In accordance with the present invention, the communication system 100 utilizes a protocol included in Motorola's well known REFLEXTM family of protocols or one similar thereto. In such a system 100, control channels are used to direct data communication receivers 105 to other frequency channels and time intervals to receive messages and to send acknowledgments. Each particular control channel is associated with a frequency and, sometimes, a specific time interval that are used to service one of a plurality of geographical areas into which the system 100 is divided. The geographical areas are referred to as "subzones". The system 100 could, for instance, be divided into subzones 110, 115, 120, as shown in FIG. 1. When a data communication receiver 105 is located within a first subzone, such as subzone 110, control information is included in a first signal received on a first frequency. When the data communication receiver 105 relocates to another subzone, such as subzone 120, a second signal includes control information transmitted by the base stations 102 within subzone 120 at a second frequency.

Figure 2:
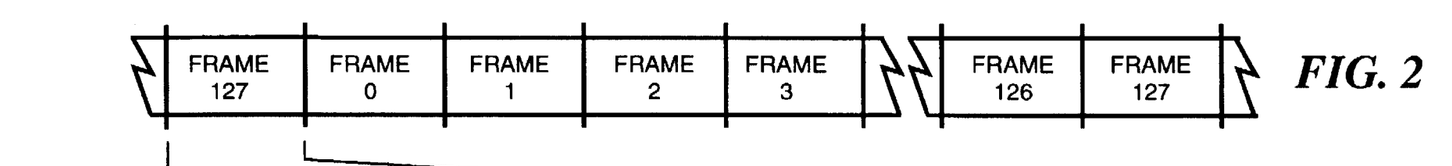
FIGS. 2–6 are timing diagrams illustrating the transmission format of the signaling protocol utilized in accordance with the present invention.

FIGS. 2–6 are timing diagrams illustrating the transmission format of the signaling protocol utilized in accordance with the preferred embodiment of the present invention. The signaling protocol can be, for example, a protocol included in the REFLEXTM family of protocols. As shown in FIG. 2, the signaling protocol enables message transmission to data communication receivers 105, such as pagers or other types of data transceivers, assigned to one or more of one-hundred-twenty-eight (128) frames which are labeled frame 0 through frame 127. It then will be appreciated that the actual number of frames provided within the signaling protocol can be greater or less than described above. The greater the number of frames utilized, the greater the battery life that may be provided to the data communication receivers operating within the system. The fewer the number of frames utilized, the more often messages can be queued and delivered to the data communication receivers assigned to any particular frame, thereby reducing the latency, or time required to deliver messages.

Figure 3:
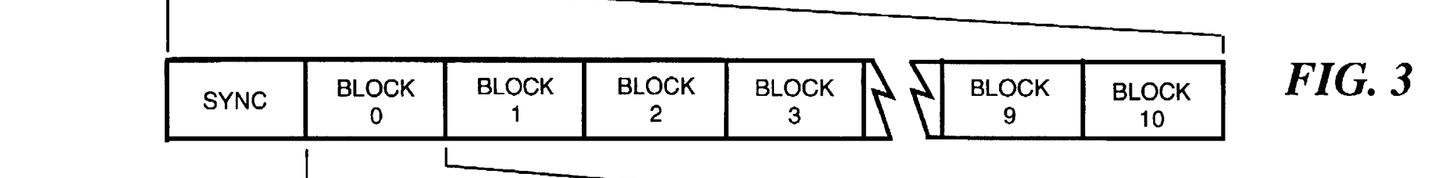
Figure 4:
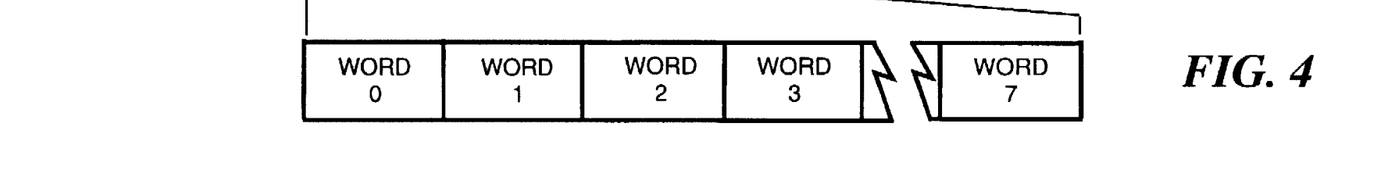

As shown in FIG. 3, the frames comprise a synchronization code (sync) followed preferably by eleven blocks of message information which are labeled block 0 through block 10. As shown in FIG. 4, each block of message information comprises preferably eight address, control, or data code words which are labeled word 0 through word 7 for each phase. Consequently, each phase in a frame allows the transmission of up to eighty-eight address, control and data code words. The address, control and data code words are preferably 31,21 BCH code words with an added thirty-second bit which provides block parity, although it will be appreciated that other code word types, such as a 23,12 Golay code word could be utilized as well. Preferably, the control words of each block include the control information that is indicative of frequencies and time intervals for use by data communication receivers 105 located in different subzones 110, 115, 120.

Figure 5:
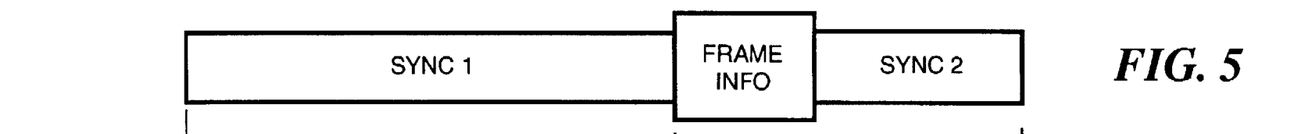
Figure 6:
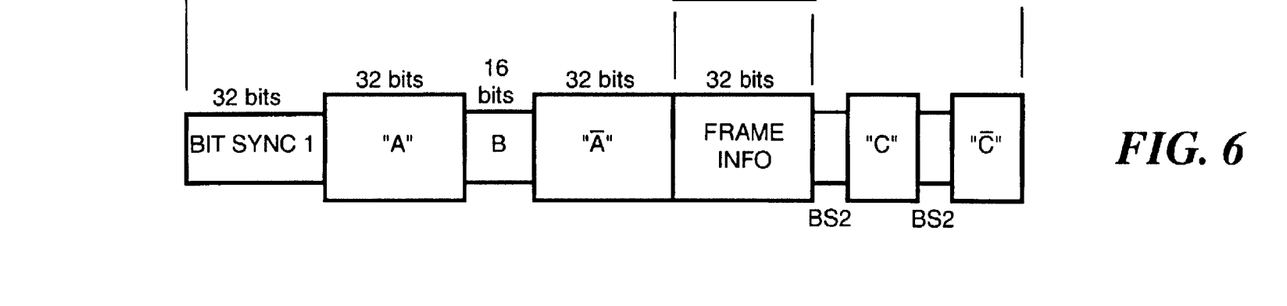

FIGS. 5 and 6 are timing diagrams illustrating the synchronization code utilized in accordance with the preferred embodiment of the present invention. In particular, as shown in FIG. 5, the synchronization code comprises preferably three parts, a first synchronization code (sync 1), a frame information code word (frame info) and a second synchronization code (sync 2). As shown in FIG. 6, the first synchronization code comprises first and third portions, labeled bit sync 1 and B, which are alternating 1,0 bit patterns which provides bit synchronization, and second and fourth portions, labeled "A" and its complement "A bar", which provide frame synchronization. The second and fourth portions are preferably single 32,21 BCH code words that are predefined, that provide high code word correlation reliability, and that are also used to indicate the data bit rate at which addresses and messages are transmitted. The first portion (bit sync 1) preferably includes 32 bits and the third portion (B) preferably includes 16 bits. It will be appreciated that, in a two-level signaling system, each bit corresponds to a single data symbol and, in a four-level signaling system, every two bits correspond to a single data symbol.

The frame information code word is preferably a single 32,21 BCH code word which includes within the data portion a predetermined number of bits reserved to identify the frame number, such as 7 bits encoded to define frame number 0 to frame number 127.

The structure of the second synchronization code is preferably similar to that of the first synchronization code described above. However, unlike the first synchronization code which is preferably transmitted at a fixed data bit rate, such as 1600 bps (bits per second), the second synchronization code is transmitted at the data bit rate at which the address and messages are to be transmitted in any given frame. Consequently, the second synchronization code allows the data communication receiver to obtain "fine" bit and frame synchronization at the frame transmission data bit rate.

According to the present invention, each data communication receiver 105 detects when it has moved out of a first subzone, e.g., subzone 110, into a second subzone, e.g., subzone 120, so that control information associated with the second subzone 120 can then be utilized by the data communication receiver 105 for message reception and message acknowledgment. Preferably, detection that the data communication receiver 105 has moved out of a subzone 110, 115, 120 is accomplished by averaging the absolute error between a "raw" received signal, i.e., a received signal prior to symbol detection, and expected symbol levels, such as those for high and low symbols, for a predetermined number of frames. When the average error exceeds a threshold level for the predetermined number of frames, the data communication receiver 105 concludes that the received signal is inappropriate for use by the data communication receiver 105, in response to which the data communication receiver 105 scans different frequencies to locate control information associated with a subzone 110, 115, 120 into which it has moved.

This advantageous and convenient averaging method for detecting poor signal quality of received signals, which is indicative of movement out of a subzone 110, 115, 120, prevents a data communication receiver 105 from holding onto a signal for too long, which could occur, for example, if the data communication receiver 105 waited until synchronization could no longer be maintained before scanning different frequencies. Additionally, the averaging method according to the present invention is accurate since the absolute error is averaged over a number of frames.

Figure 7:
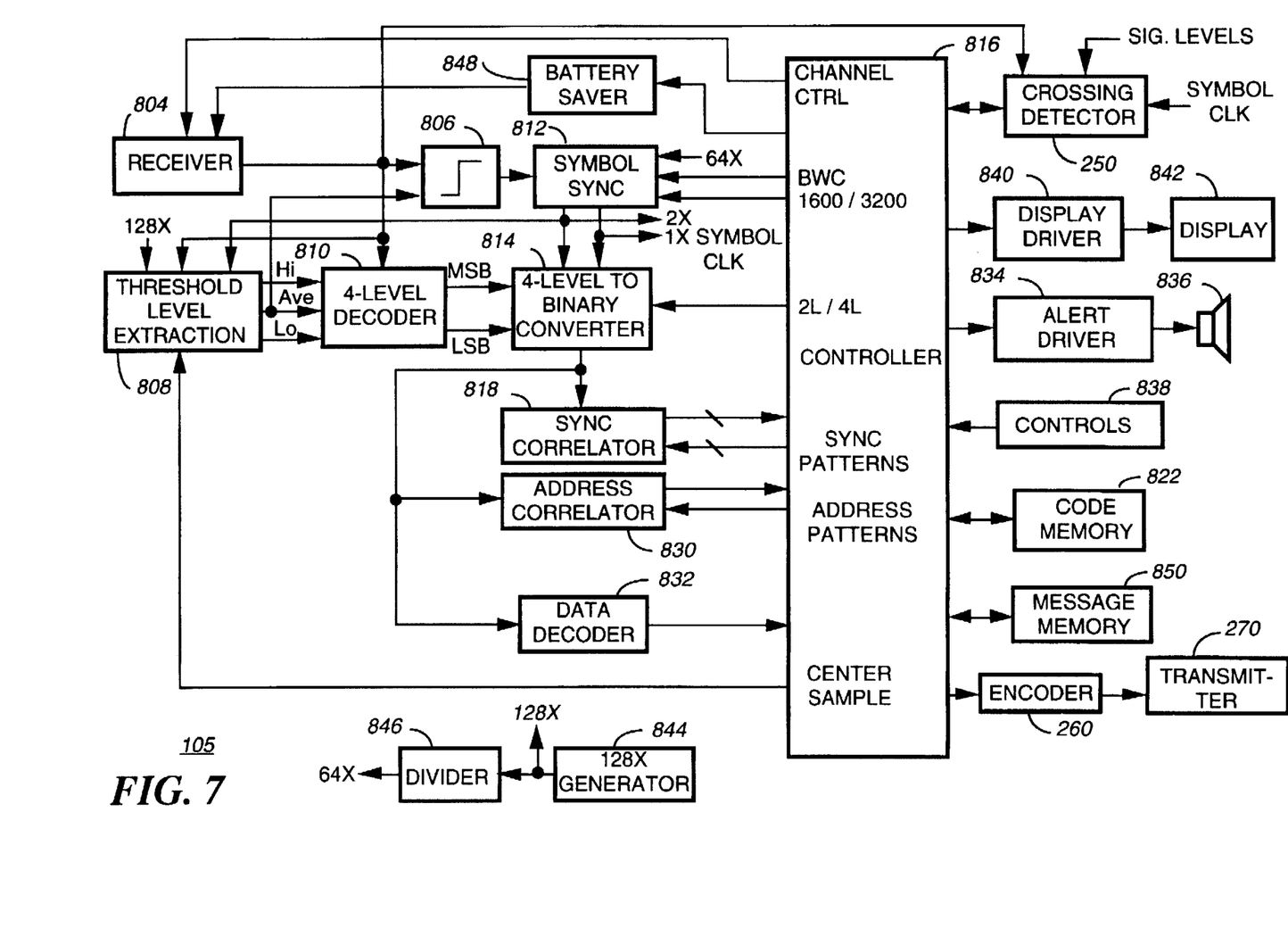
FIG. 7 is an electrical block diagram of a data communication receiver included in the communication system of FIG. 1 according to the present invention.

FIG. 7 is an electrical block diagram of the data communication receiver 105 in accordance with the present invention. The data communication receiver 105 is capable of receiving address, control and message information, hereafter called "data," which is modulated using preferably 2-level and 4-level frequency modulation techniques. The transmitted data is received as a radio frequency (RF) signal and processed by a receiver section 804 in a manner well known in the art to provide an analog 2-level or 4-level recovered data signal, hereafter called a recovered data signal. The recovered data signal is coupled to one input of a data limiter 806, to one input of a threshold level extraction circuit 808, to an input of a decoder, such as 4-level decoder 810, and to an input of a crossing detector 250 in accordance with the present invention.

When power is initially applied to the receiver portion, a 128X clock, i.e. a clock having a frequency equivalent to 128 times the slowest data bit rate, is selected for use by the threshold level extraction circuit 808. The 128X clock is generated by 128X clock generator 844, which is preferably a crystal controlled oscillator operating at 204.8 kHz (kilohertz). The output of the 128X clock generator 844 couples to an input of frequency divider 846 which divides the output frequency by two to generate a 64X clock at 102.4 kHz. Using the 128X clock, the threshold level extraction circuit 808 asynchronously detects the peak and valley signal amplitude values and generates the low (Lo), average (Avg) and high (Hi) threshold output signal values required for modulation decoding. After symbol synchronization is achieved with the synchronization signal, a controller 816 generates a second control signal (Center Sample) to enable selection of a 1X symbol clock which is generated by symbol synchronizer 812.

The average threshold output signal (AVG) is coupled to a second input of the data limiter 806. The data limiter 806 limits the analog recovered data signal to provide a symbol synchronization signal having a square wave output, the positive level representing the two positive deviation excursions of the analog recovered data signal above the average threshold output signal, and the negative level representing the two negative deviation excursions of the analog recovered data signal below the average threshold output signal. The average threshold output signal (AVG) enables adjustment of the limiter threshold which is required to insure symmetrical limiting of the analog recovered data signal.

The output of the data limiter 806 is coupled to an input of the symbol synchronizer 812, which selects the sample clock rate for symbol transmission rates of 1600 and 3200 symbols per second in response to a control signal provided by the controller 816 and which generates symbol clocks that are synchronized with the recovered data signal.

The decoder 810 receives the high threshold output signal (Hi), the average threshold output signal (Avg), and the low threshold output signal (Lo) and generates different symbols as each of the three threshold values is exceeded. The 4-level binary converter 814 then utilizes the symbol output signals (MSB, LSB) to control the conversion of the symbol output signals as either 2-level FSK data or 4-level FSK data, thereby generating a binary data stream. The serial binary data stream generated by the 4-level to binary converter 814 is coupled to inputs of a synchronization word correlator 818. Predetermined "A" word synchronization patterns are recovered by the controller 816 from a code memory 822 and are coupled to the synchronization word correlator 818. When the synchronization pattern received matches one of the predetermined "A" word synchronization patterns within an acceptable margin of error, an "A" or "A-bar" output is generated and is coupled to controller 816. The particular "A" or "A-bar" word synchronization pattern provides frame synchronization to the start of the frame ID word and also defines the data bit rate of the message to follow.

The serial binary data stream is also used by the synchronization word correlator 818 to decode the frame word and provide an indication of the frame number currently being received by the controller 816. During sync acquisition, such as following initial receiver turn-on, power is supplied to the receiver portion by battery saver circuit 848, which enables the reception of the "A" synchronization word and which continues to be supplied to enable processing of the remainder of the synchronization code.

A predetermined "C" word synchronization pattern is recovered by the controller 816 from a code memory 822 and is also coupled to the synchronization word correlator 818 for providing "fine" frame synchronization to the start of the data portion of the frame. The controller 816 then recovers the address patterns assigned to the data communication receiver 105 and couples the patterns to an input of the address correlator 830. When any of the address code words included matches any of the address patterns assigned to the data communication receiver 105 within an acceptable margin of error, the message information associated with the address is then decoded by the data decoder 832 and stored in a message memory 850 in a manner well known to one of ordinary skill in the art. Following the storage of the message information, a sensible alert signal is generated by the controller 816. The sensible alert signal is preferably an audible alert signal, although it will be appreciated that other sensible alert signals, such as tactile alert signals, and visual alert signals can be generated as well. The audible alert signal is coupled by the controller 816 to an alert driver 834 which is used to drive an audible alerting device, such as a speaker or a transducer 836. The user can override the alert signal generation through the use of user input controls 838 in a manner well known in the art.

Following the detection of an address associated with the data communication receiver 105, the message information is coupled to the input of data decoder 832 which decodes the encoded message information into preferably a BCD or ASCII format suitable for storage and subsequent display. The stored message information can be recalled by the user using the user input controls 838, in response to which the controller 816 recovers the message information from memory and provides the message information to a display driver 840 for presentation on a display 842, such as an LCD display. When the data communication receiver 105 is capable of two-way communication, the data communication receiver 105 further includes an encoder 260 for encoding information according to a signaling format, such as REFLEX™, and a transmitter 270 for transmitting the encoded information to a base station 102 (FIG. 1) included in the communication system 100.

In accordance with the present invention, the data communication receiver 105 further includes a crossing detector 250 for detecting a subzone crossing by averaging the absolute symbol error over a number of received frames. The crossing detector 250 can be better understood by referencing the electrical block diagram of FIG. 8. Preferably, the crossing detector 250 includes an error processor 275 for controlling the operation of the crossing detector 250. The error processor 275 receives the symbol clock signal, the signal levels from the threshold level extraction circuit 808, the demodulated received signal from the receiver circuit 804, and a control signal from the controller 816. The control signal indicates to the processor 275 when the "A" and "A bar" words have been received and when successive frames are received.

Figure 8:
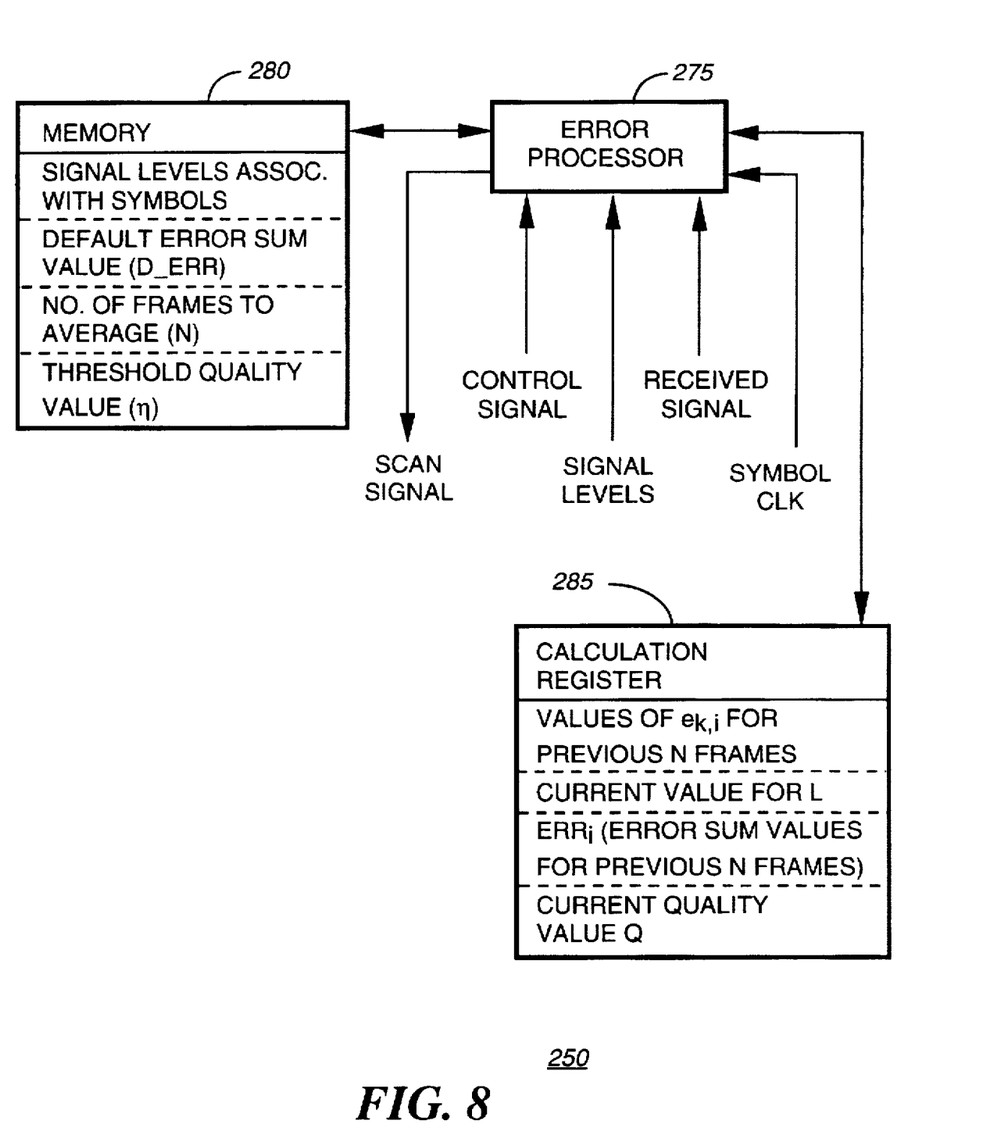
FIG. 8 is an electrical block diagram of a crossing detector included within the data communication receiver of FIG. 7 according to the present invention.

The crossing detector 250 further includes a memory 280 for storing the signal levels associated with the different data symbols, a default error sum value (D_ERR), a threshold quality value (η), and a pre-programmed number (N) associated with a number of frames for which error sum values are to be averaged. The pre-programmed number of frames can, for instance, equal ten, i.e., N=10. The memory 280 can be programmed with the number N, the default value, D_ERR, and the threshold quality value, η, via the user controls 838 (FIG. 7) or via a data port (not shown), for instance. The signal levels are preferably either received directly from the threshold level extraction circuit 808 or calculated from the threshold values provided by the threshold level extraction circuit 808 in a conventional manner. A calculation register 285 preferably stores variables and values derived by the error processor 275 during operation of the crossing detector 250.

According to the present invention, the crossing detector 250 calculates the absolute symbol error (e) for a particular number of symbols received in the synchronization code (FIGS. 5 and 6). Preferably, the absolute symbol error is calculated for portions of the first sync code and the frame information that are received after detection of the A word. Specifically, in a two-level system, the symbol errors for the sixty-fourth symbol (which immediately follows the "A" word) through the one-hundred-forty-third symbol (which is included in the frame information) are determined by comparing the actual value of the received signal to the expected symbol level. For example, when the signal level corresponding to a high symbol, e.g., a symbol of "1", equals 0.25 millivolts, and the sampled signal has an amplitude of 0.28 millivolts, the symbol error equals 0.03 millivolts. The error processor 275 sums the symbol errors to arrive at an error sum value utilizing the following equation:

$$ERR_i = \frac{1}{80L} \sum_{k=64}^{143} |e_{k,i}| \quad (1)$$

where ERR represents the error sum value for a given frame i, L represents the symbol level that corresponds to a high symbol, i.e., a symbol of "1", k represents the numbers of the symbols for which error measurements are being calculated, and $e_{k,i}$ represents the symbol error for the kth symbol in the ith frame.

Upon A word detection, when synchronization has been established, a measure of quality for a given frame can be obtained using the above formula to average the absolute error between the raw received signal at the symbol sampling instant and the symbol levels obtained from the threshold level extraction circuit 808 (FIG. 7). Using this formula, the variable ERR varies inversely with signal quality, i.e., ERR becomes larger as the signal quality decreases. When the A word is missed for a given frame, a default value, D_ERR, is preferably assigned as the error sum value for that frame. The default value, for instance, can be equal to 0.3.

Rayleigh fading and burst noise from simulcast distortion will cause a large spread in the distribution of the error sum value from frame to frame, so it is desirable to average several measurements in order to tighten the distribution. Preferably, the error sum value, ERR, is averaged over N frames to calculate a quality value, Q, according to the following equation:

$$Q = \frac{1}{N} \sum_{i=1}^{N} ERR_i \quad (2)$$

The quality value Q is then compared to the stored threshold quality value η. When Q exceeds or equals η, indicating a poor quality signal, the error processor 275 provides an output to the controller 816 (FIG. 7) indicating that the received signal is poor in quality and that the data communication receiver 105 should scan other frequencies to receive control information on another channel. In other words, the crossing detector 250 according to the present invention conveniently provides an indication that the data communication receiver 105 has moved out of range of a first base station 102 (FIG. 1) in a first subzone 110.

Figure 9:
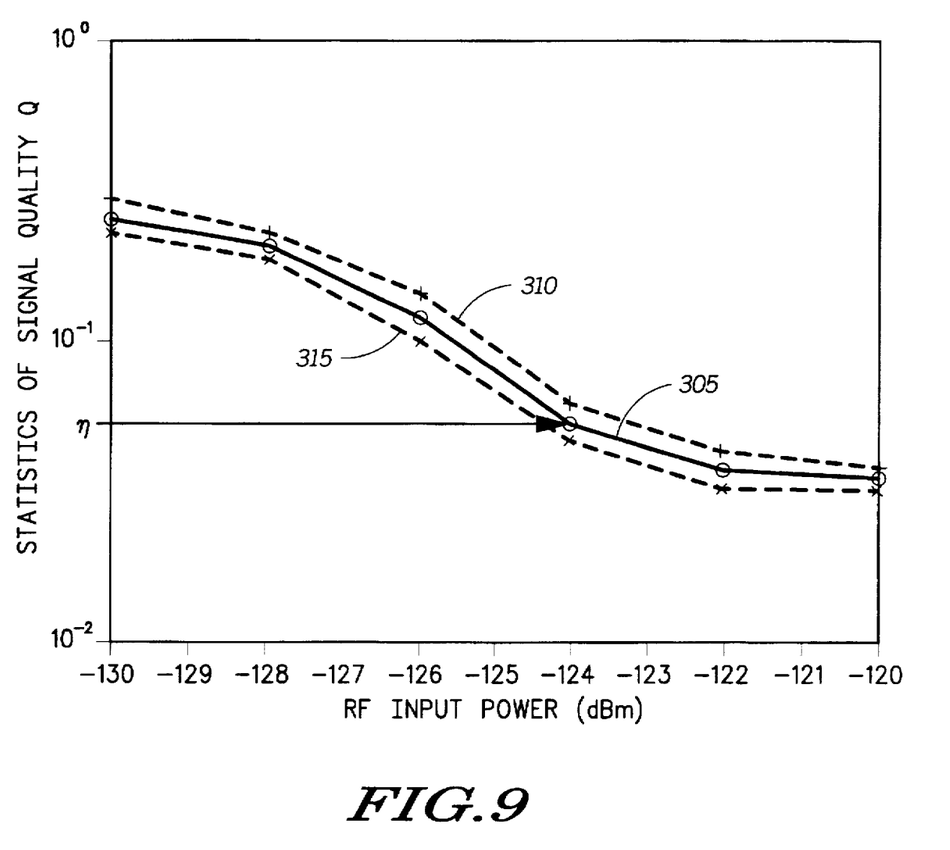
FIGS. 9–12 are plots of simulated statistics of a channel quality value detected by the crossing detector of FIG. 8 in accordance with the present invention.
Figure 10:
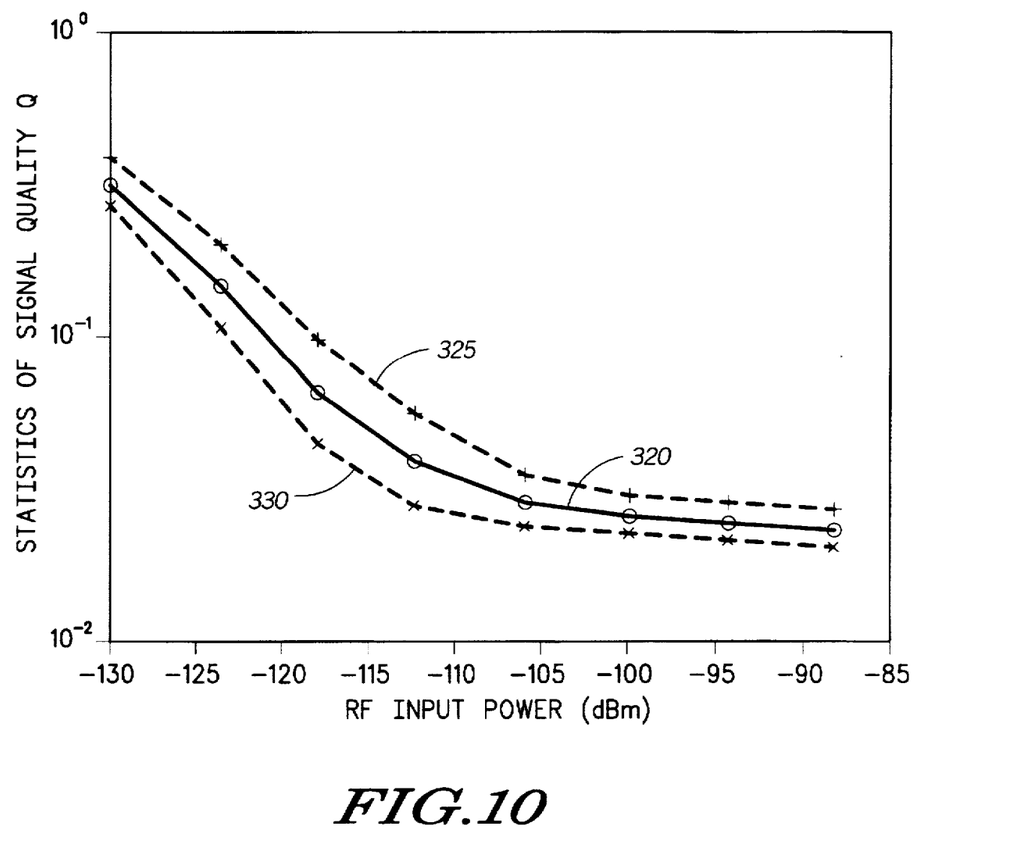
Figure 11:
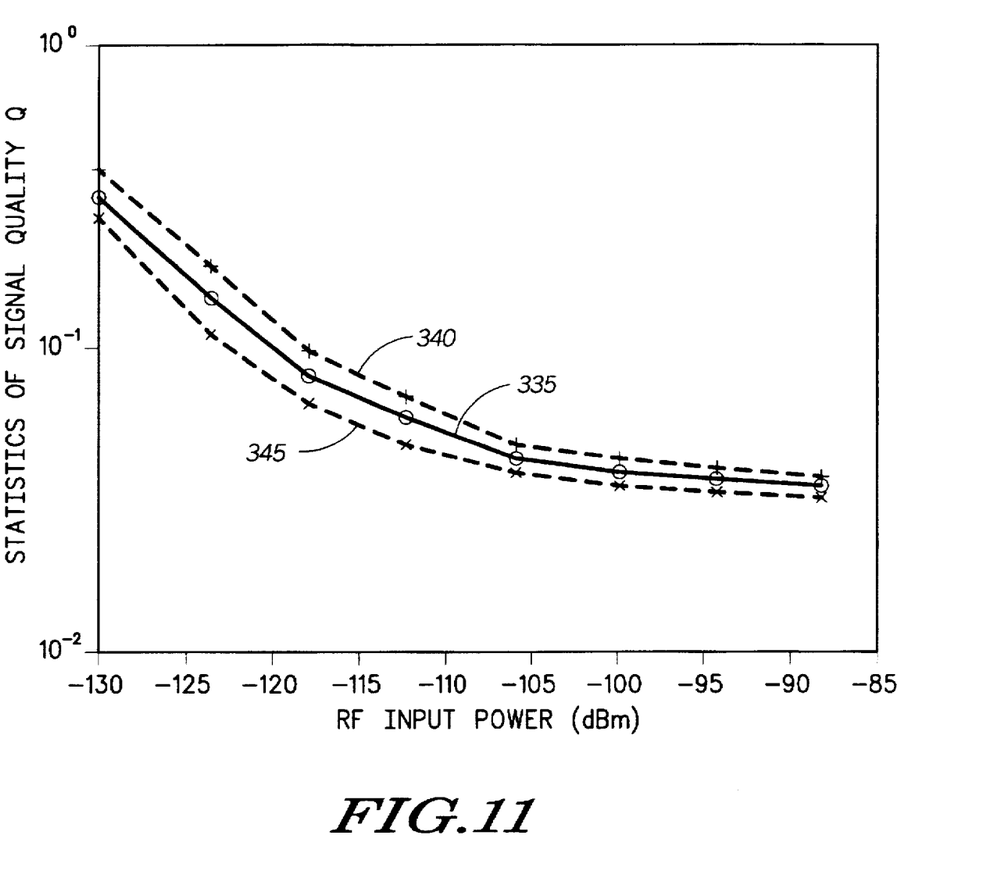

If, for a given local channel condition, the error sum value ERR has a mean $\mu$ and a variance $\sigma^2$, then Q will be approximately Gaussian distributed with mean $\mu$ and variance $\sigma^2/N$, according to the well-known Central Limit Theorem. FIGS. 9–12 show simulated statistics of this channel quality value Q in noise-only and simulcast channels, respectively, for a data communication receiver 105 pre-programmed with N=10. In FIG. 9, both the mean $\mu$ (curve 305) and the spread $\mu\pm\sigma/\sqrt{N}$ (curves 310, 315) are plotted versus average RF input power for a static channel. It can be seen from FIG. 9 that the threshold quality value $\eta$ could be chosen to be 0.05 so that quality values equal to or exceeding 0.05 would result in a determination of poor channel quality, in response to which other frequencies are scanned to locate control information on another channel with better quality. FIG. 10 shows the mean $\mu$ (curve 320) and the spread $\mu\pm\sigma/\sqrt{N}$ (curves 325, 330) plotted versus RF input power for a slowly fading channel. In FIG. 11, the mean $\mu$ (curve 335) and the spread $\mu\pm\sigma/\sqrt{N}$ (curves 340, 345) are plotted versus RF input power for rapidly fading channel. For each of the curves depicted in FIGS. 9–11, the quality value Q decreases as the signal strength increases.

Figure 12:
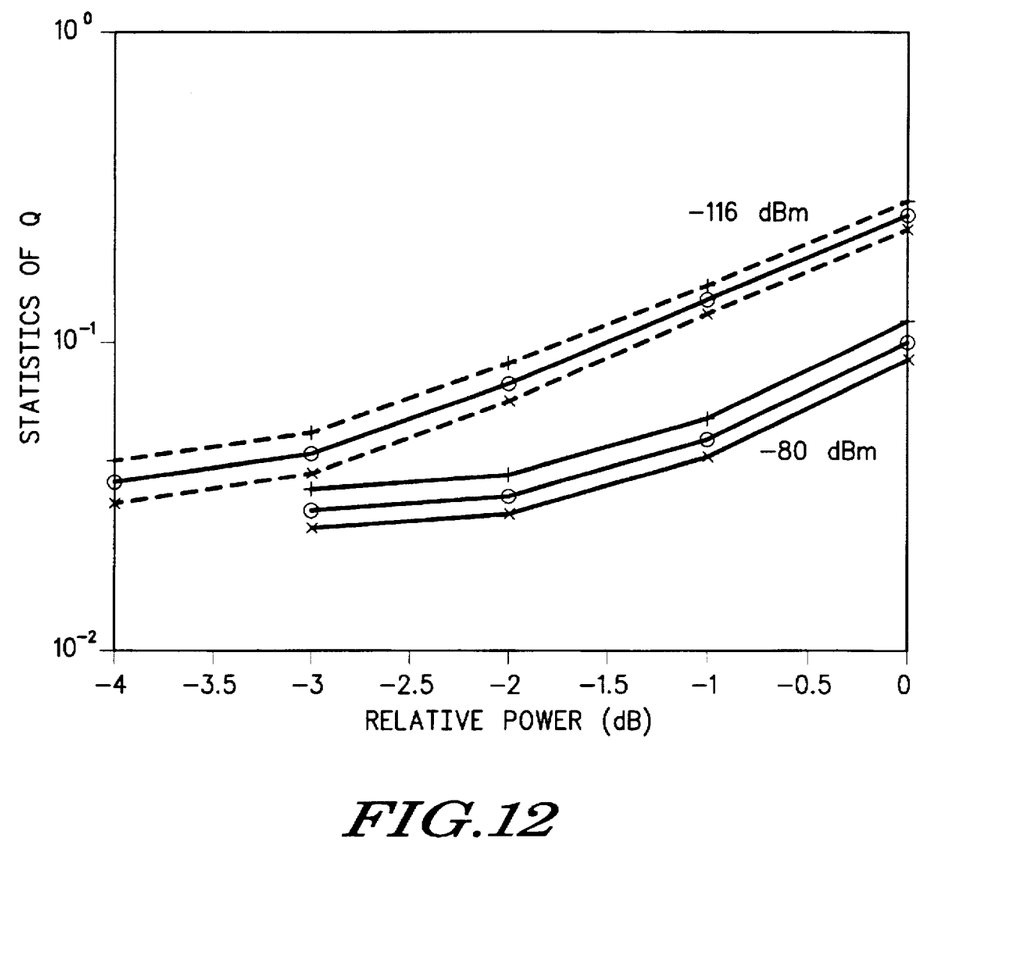

In FIG. 12, means and spreads of the quality value Q are plotted versus relative power for a two-path simulcast channel with a differential delay of seventy-five microseconds, i.e., 75 μs, and a frequency offset of eighteen hertz, i.e., 18 Hz. It can be seen that the signal quality degrades as the two paths become similar in power.

By setting the threshold $\eta$ for the quality value, a poor channel can be detected. This effectively provides detection of subzone crossings. Furthermore, according to simulation data, the detection of a subzone crossing for a static channel occurs approximately 5 dB below the point at which the word error rate becomes 1%. In other words, the detection of the subzone crossing occurs when the probability of detecting the A word is still about 99%, so the data communication receiver 105, using the crossing detector 250 according to the present invention, releases a channel long before a conventional pager would release the channel based on non-detection of the synchronization words. As a result, the data communication receiver 105 advantageously switches to a different channel within another subzone before the probability of missing or erroneously decoding messages has become too great.

Figure 13:
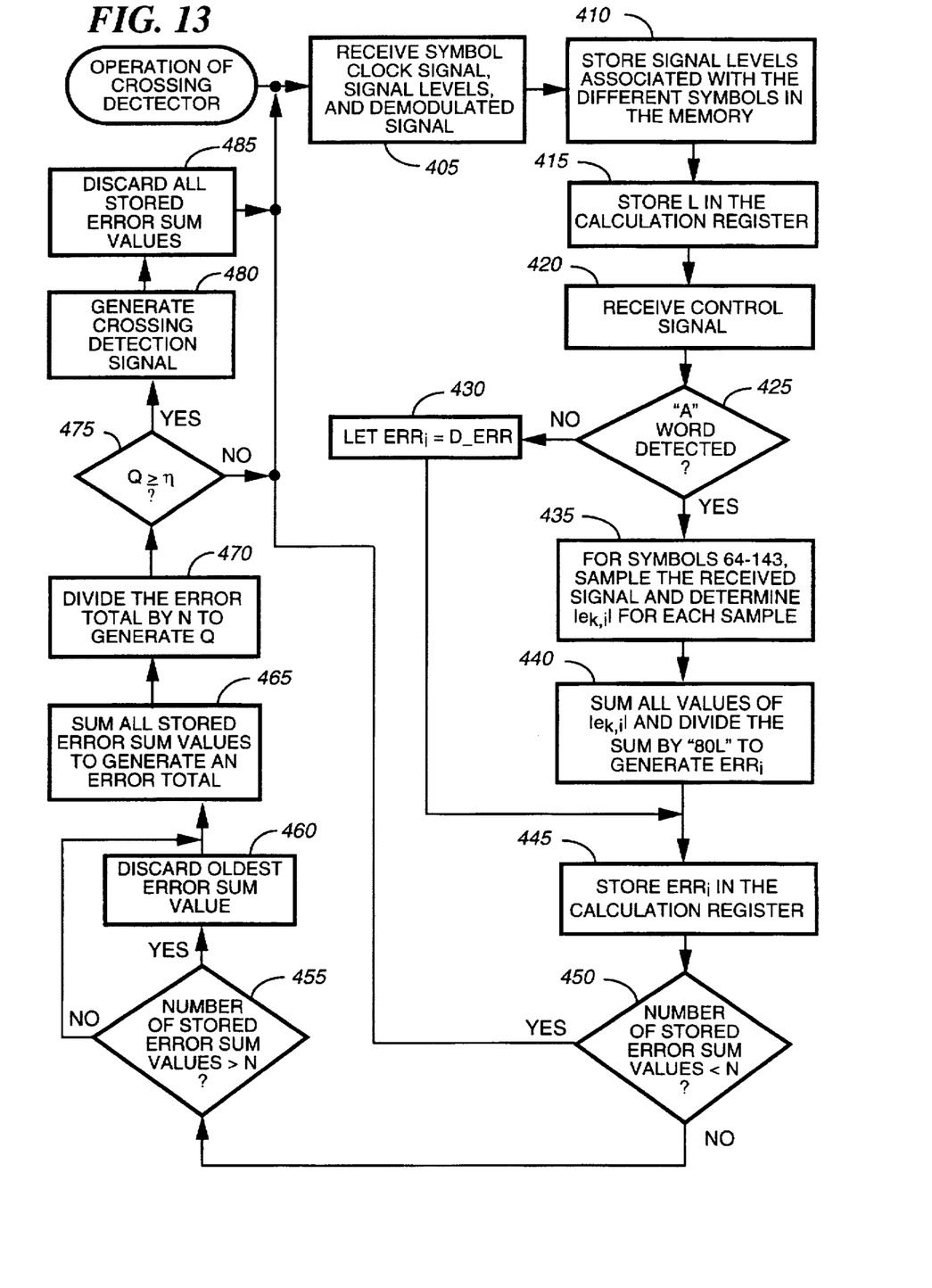
FIG. 13 is a flowchart illustrating an operation of the crossing detector of FIG. 8 according to the present invention.

Referring next to FIG. 13, a flowchart illustrates the operation of the crossing detector 250 in accordance with the present invention. At step 405, the error processor 275 receives the symbol clock signal, the demodulated signal that has been received at a first frequency, and the signal levels. The signal levels associated with the different symbols are then stored, at step 410, in the memory 280. Additionally, the signal level associated with a high data symbol, or a symbol of "1," is stored, at step 415, in the calculation register 285 as the variable L, and the control signal is received, at step 420, from the controller 816 (FIG. 7). When, at step 425, the control signal indicates that the "A" word was not received for the current frame within a predetermined window of time, the error processor 275 assigns, at step 430, the default error sum value as the error sum value for the current frame, i.e., $ERR_i = D\_ERR$ for the ith frame. Also, according to the present invention, detection of the "A bar" word, as opposed to non-detection of the "A" word, results in assignment of the default error sum value as the error sum value for the current frame.

When, at step 425, the control signal indicates that the "A" word has been detected, the error processor 275 samples, at step 435, the demodulated signal at the symbol sampling instant for each remaining symbol in the first synchronization code after detection of the "A" word and for each remaining symbol in the frame information following the first synchronization code. In a two-level system, for example, the sixty-fourth symbol through the one-hundred-forty-third symbol are preferably sampled. Also at step 435, the error processor 275 further determines, for each sample, the absolute value of the error associated with that sampled symbol. This can be easily accomplished by calculating the difference between the sampled value and the expected signal level for that symbol. It will be appreciated that this number of symbols has been chosen to give a fair average. However, other numbers of symbols can alternatively be chosen without departing from the teachings of the present invention. Furthermore, the starting and stopping points for sampling the symbols need not be as described above. In such situations, equation (1) set forth above would simply be modified so that the absolute symbol error was summed for different values of k.

Thereafter, at step 440, all of the absolute errors are summed to generate an intermediate error value, and the intermediate error value is divided by "80*L", i.e., the number of sampled symbols multiplied by the signal level associated with a "1". Steps 435 and 440 result in the generation of the error sum value, $ERR_i$, according to equation (1) mentioned above.

The error sum value, whether arrived at through calculation or default, is then stored, at step 445, in the calculation register 285. Next, the error processor 275 determines, at step 450, whether the number of stored error sum values is less than the predetermined number (N) of frames for which errors are to be averaged. When error sum values for N frames have not yet been stored, processing continues at step 405. When, at step 450, the number of stored error sum values is not less than N, the error processor 275 determines, at step 455, whether the number of stored error sum values exceeds N. When there are more than N error sum values stored in the calculation register 285, the oldest error sum value is discarded, at step 460. Next, at step 465, all stored error sum values are added to generate an error total, which is divided, at step 470, by N. Steps 465 and 470 result in the generation of the quality value Q according to equation (2) mentioned above. In other words, the currently calculated error sum value is added to other error sum values that have been previously calculated to generate Q.

When, at step 475, the quality value Q is less than the threshold quality value $\eta$, the error processor 275 continues operation at step 405. On the other hand, when $Q \geq \eta$, indicating a poor quality signal, the error processor 275 generates a "crossing detection" signal, at step 480, and discards all stored error sum values, at step 485. According to the present invention, the crossing detection signal can be any signal that indicates to the controller 816 that the present channel should be released and other frequencies scanned for a stronger signal. This can be done, for example, by outputting a high voltage (e.g., 0.5 volts) signal when $Q \geq \eta$ and by outputting a low voltage at all other times. The controller 816 receives the crossing detection signal, which is indicative of poor signal quality, and scans other frequencies for a new control channel at a second frequency in a manner well known to one of ordinary skill in the art.

The implementation of the process depicted in FIG. 13 results in a sliding window of error sum values that are averaged over N frames. Alternatively, in order to save memory space, the error sum values for N frames could be averaged then discarded so that successive blocks of N frames are processed by the crossing detector 250.

In summary, the data communication receiver described above is capable of receiving control information on different channels within different subzones of a communication system. According to the present invention, the data communication receiver includes a crossing detector for monitoring channel quality for a signal received on a given frequency. When the channel quality is determined to be relatively poor, it is likely that the data communication receiver has relocated into another subzone. Therefore, the data communication receiver releases the current channel and scans other frequencies for reception of different control information.

The crossing detector according to the present invention averages the absolute symbol errors for a particular number of symbols, the numbers and locations of which can be conveniently programmed into the data communication receiver, to generate an error sum value for that frame. This averaging process is preferably performed over a programmed number of frames to tighten the distribution. The resulting quality value can then be compared to a predetermined threshold value to make a determination as to signal quality. When the comparison indicates that quality is poor, then other channels are scanned.

One advantage of the channel detector according to the present invention is that a channel is released sooner than would be the case if scanning was delayed until synchronization could not be obtained. Therefore, the data communication receiver is able to switch channels before messages are received and decoded erroneously or even missed. Another advantage is that the effects of burst noise and Rayleigh fading is mitigated because the errors are averaged over a number of symbols as well as over a number of frames. As a result, deviations in quality do not cause premature channel scanning.

It will be appreciated by now that there has been provided an improved method and apparatus for detecting poor channel quality.

What is claimed is:

1. A method in a data communication receiver for detecting poor signal quality of a received signal comprising frames including a synchronization code comprising data symbols associated with expected signal levels, the method including the steps of:

receiving a first signal on a first frequency;

processing absolute symbol errors for a number of data symbols included in the synchronization code of a current frame to generate an error sum value, in response to the synchronization code being detected within a predetermined window of time;

assigning a default error sum value as the error sum value for the current frame, in response to the synchronization code not being detected within a predetermined window of time;

averaging the error sum value with other error sum values previously calculated for, or assigned by default to, other frames to generate a quality value;

determining that the first signal is of poor quality when the quality value exceeds a threshold quality value; and scanning other frequencies to locate a second frequency on which to receive a second signal in response to determining that the first signal is of poor quality.

2. The method of claim 1, wherein the processing step includes the steps of:

comparing the first signal to the expected signal levels to determine the absolute symbol errors;

adding the absolute symbol errors to generate an intermediate error value;

dividing the intermediate error value by the number of data symbols; and dividing the intermediate error value by an expected signal level associated with a high data symbol.

3. The method of claim 1, wherein the averaging step comprises the steps of:

adding the error sum value and the other error sum values to generate an error total; and dividing the error total by a number of frames for which the error sum value and the other error sum values were calculated to generate the quality value.

4. The method of claim 1, wherein the processing, averaging, and determining steps are performed by a crossing detector included within the data communication receiver, and wherein the method further comprises, in the crossing detector, the step of:

generating a detection signal indicative of poor signal quality.

5. The method of claim 1, wherein the number of data symbols comprises symbols included in frame information and a portion of a first synchronization code of the first signal, and wherein the method further comprises the step of:

detecting, subsequent to the receiving step and prior to the processing step, a predetermined pattern that precedes the portion of the first synchronization code.

6. A data communication receiver for detecting poor signal quality of received signals, the data communication receiver comprising:

a receiver section for receiving a first signal on a first frequency, the first signal comprising frames including a synchronization code comprising data symbols associated with expected signal levels;

a crossing detector coupled to the receiver section for processing absolute symbol errors for a number of data symbols included in the synchronization code of a current frame to generate an error sum value, in response to the synchronization code being detected within a predetermined window of time, and for assigning a default error sum value as the error sum value for the current frame, in response to the synchronization code not being detected within a predetermined window of time, and for averaging the error sum value with other error sum values previously calculated for, or assigned by default to, other frames to generate a quality value, the crossing detector comprising a processor for determining that the first signal is of poor quality when the quality value exceeds a threshold quality value; and a controller coupled to the crossing detector for activating the receiver section to scan other frequencies to locate a second frequency on which to receive a second signal in response to a determination that the first signal is of poor quality.

7. The data communication receiver of claim 6, wherein the crossing detector further comprises:

a memory coupled to the processor for storing the expected signal levels, a default error sum value, a number of frames for which the error sum value and the other error sum values are calculated, and the threshold quality value.

8. The data communication receiver of claim 6, further comprising:

controls coupled to the crossing detector for setting and storing the threshold quality value.

9. The data communication receiver of claim 6, further comprising:

a calculation register coupled to the processor for storing variables derived during calculation of the threshold quality value.

10. The data communication receiver of claim 6, wherein the processor comprises:

comparing means for comparing the first signal to the expected signal levels to determine the absolute symbol errors;

adding means coupled to the comparing means for adding the absolute symbol errors to generate an intermediate error value;

first dividing means coupled to the adding means for dividing the intermediate error value by the number of data symbols; and second dividing means coupled to the adding means for dividing the intermediate error value by an expected signal level associated with a high data symbol.

11. The data communication receiver of claim 6, wherein the processor comprises:

adding means for adding the error sum value and the other error sum values to generate an error total; and dividing means coupled to the adding means for dividing the error total by a number of frames for which the error sum value and the other error sum values were calculated to generate the quality value.

12. The data communication receiver of claim 6, wherein the error sum value and the other error sum values are calculated for a predetermined number of frames.

13. The data communication receiver of claim 12, wherein the predetermined number of frames comprises ten frames.

14. A data communication receiver for detecting poor signal quality of received signals, the data communication receiver comprising:

a receiver section for receiving a first signal on a first frequency, the first signal comprising frames including a synchronization code comprising data symbols associated with expected signal levels;

a crossing detector coupled to the receiver section for processing absolute symbol errors for a number of data symbols included in the synchronization code of a current frame to generate an error sum value, in response to the synchronization code being detected within a predetermined window of time, and for assigning a default error sum value as the error sum value for the current frame, in response to the synchronization code not being detected within a predetermined window of time, and for averaging the error sum value with other error sum values previously calculated for, or assigned by default to, other frames to generate a quality value, the crossing detector comprising:

a processor for determining that the first signal is of poor quality when the quality value exceeds a threshold quality value;

a memory coupled to the processor for storing the expected signal levels, a default error sum value, a number of frames for which the error sum value and the other error sum values are calculated, and the threshold quality value; and a calculation register coupled to the processor for storing variables derived during calculation of the quality value; and a controller coupled to the crossing detector for activating the receiver section to scan other frequencies to locate a second frequency on which to receive a second signal in response to a determination that the first signal is of poor quality.

15. The data communication receiver of claim 14, wherein the processor comprises:

comparing means for comparing the first signal to the expected signal levels to determine the absolute symbol errors;

adding means coupled to the comparing means for adding the absolute symbol errors to generate an intermediate error value;

first dividing means coupled to the adding means for dividing the intermediate error value by the number of data symbols; and second dividing means coupled to the adding means for dividing the intermediate error value by an expected signal level associated with a high data symbol.

16. The data communication receiver of claim 14, wherein the processor comprises:

adding means for adding the error sum value and the other error sum values to generate an error total; and dividing means coupled to the adding means for dividing the error total by a number of frames for which the error sum value and the other error sum values were calculated to generate the quality value.

* * * * *